United States Patent [19]
Angelbeck et al.

[11] 3,858,122
[45] Dec. 31, 1974

[54] VIBRATION ISOLATION IN A GAS LASER

[75] Inventors: Albert W. Angelbeck, Manchester; Donald J. Longtin, Glastonbury, both of Conn.

[73] Assignee: United Aircraft Corporation, East Hartford, Conn.

[22] Filed: Dec. 26, 1973

[21] Appl. No.: 427,961

[52] U.S. Cl................ 331/94.5 R, 330/4.3, 248/20, 248/21, 248/358 R, 331/94.5 D
[51] Int. Cl............................ H01s 3/02, F16f 15/02
[58] Field of Search ....... 331/94.5; 330/4.3; 248/20, 248/21, 26, 146, 358 R; 350/295

[56] References Cited
UNITED STATES PATENTS
| | | | |
|---|---|---|---|
| 3,768,765 | 10/1973 | Breckenridge | 248/146 |
| 3,784,146 | 1/1974 | Matthews | 248/358 R |
| 3,808,553 | 4/1974 | Locke et al. | 331/94.5 D |

*Primary Examiner*—Robert J. Webster
*Attorney, Agent, or Firm*—Anthony J. Criso

[57] ABSTRACT

A technique for isolating the optical components of a gas laser system from the vibrations in the enclosure around the optical cavity and the structure supporting the enclosure is disclosed. A gas tight enclosure around the optical cavity is rigidly supported from ground in a conventional fashion. An external optical bench is also supported from ground in a manner which does not transmit vibration from ground to the bench with a second optical bench internal to the enclosure fixedly attached to the external bench by a gas tight, vibration isolation mount. Since the external bench supports the necessary optics external to the enclosure, the internal optics and external optics are interconnected in a system which is vibrationally isolated from both the enclosure around the optical cavity and ground. The invention herein described was made in the course of or under a contract or subcontract thereunder with the Department of the Air Force.

4 Claims, 2 Drawing Figures

VIBRATION ISOLATION IN A GAS LASER

BACKGROUND OF THE INVENTION

1. Field of Invention

The present invention relates to lasers and more particularly to a gas laser structure in which the laser optics are isolated from the surrounding vibrational disturbances.

2. Description of the Prior Art

A gas laser is typically operated with a gas pressure in the optical cavity that is lower than atmospheric pressue and sometimes approaches vacuum condtions. This feature inherently involves various fixtures which permit a wall to be penetrated by such items as piping, wiring, structural elements and optical ports in a manner which maintains a pressure differential across the wall. Also, the operating requirements for many laser systems, particularly stable frequency lasers, require that optics be isolated as best as possible from any vibration of the immediate environment. A convenient technique for preventing the transfer of vibrational motions to the internal optics in such a system is to isolate the optical cavity from the remainder of the laser apparatus; this approach has been shown effective in many of the smaller laboratory type assemblies. In an optical resonator, the correlation between the change in length of the resonator, dL, and the change in the frequency, df, of the output from the resonator is described by the relationship $$df = - cdL/L \ \lambda$$

where
  c is the velocity of light, and
  $\lambda$ is the wavelength of the resonator output. Thus, for a resonator one meter in length a change in resonator length of one wavelength results in a frequency shift of 300 MHz, a quantity which is two to four orders of magnitude too great for most stable laser applications. In a like manner, if the same system is operated at a wavelength of approximately ten microns, a one wavelength shift of a mirror in a direction normal to the optical axis of the resonator results in an angular motion of ten microradians.

In some applications the laser generator is used in combination with optics which are external to the laser cavity, and in addition to stabilizing the output beam, alignment must be maintained between the internal and the external optics. The basic problem is that even if the laser generation optics is suitably isolated from the vibrtions in the surrounding structure, there is still the problem of maintaining a suitable alignment between the internal and external optics. A primry concern in the operation of many stable gas lasers therefore is the correlation or alignment between the internal and external optics in a system having a pressure differential between the laser generator and the environment, and vibration in the surrounding structure which is sufficient to deleteriously affect the quality of the laser output beam.

SUMMARY OF THE INVENTION

A primary object of the present invention is to isolate any vibration present in the gas tight enclosure of a gas laser from the structure supporting the optial generating means. Another object is to provide a precise correlation between the position of the internal optics used to generate a useful beam of laser radiation and the position of the external optics used to condition this beam.

According to the present invention, an external optical bench which is supported from ground by vibration isolators, supports both an internal optical bench in a gas laser enclosure, and external optics fixedly attached to the external optical bench thereby providing a rigid interlock between the position of the internal optics and the external optics; an enclosure around the internal bench which may be subjected to vibrations from the auxiliary equipment required in the laser operation and anomalous effects in the vicinity of the laser is rigidly supported from ground, and is vibrationally isolated from the internal bench.

A primary advantage of the present invention is the large range of pressure variations which can be acommodated across the optical bench feedthrough in the laser enclosure. Also, the forces acting on the internal optical bench as a result of any pressure differential across the enclosure are essentially nulled thereby avoiding any uneven loading of the bench. Further, the present invention provides vibrational isolation of the gas laser enclosure from both the internal and external optical benches.

A primary feature of the present invention is the hard interlock between the internal and external optics of the overall laser system. Also, the feedthroughs in the gas laser enclosure have the same surface area so that the internal optical bench does not experience distorting loads to the pressure differential. In addition, the design permits a differential thermal growth between the internal and external optical benches without concomitant misalignment in the optical system. Further, the internal optics in the laser are readily disconnected for maintenance and removal. This invention is also characterized by the two types of ground supports, namely, the vibration isolator-type supports and the rigid ground supports.

The foregoing and other objects, features and advantages of the present invention will become more apparent in the light of the following detailed description of a preferred embodiment thereof as illustrated in the accompanying drawing.

DESCRIPTION OF A PREFERRED EMBODIMENT

Figure 1:
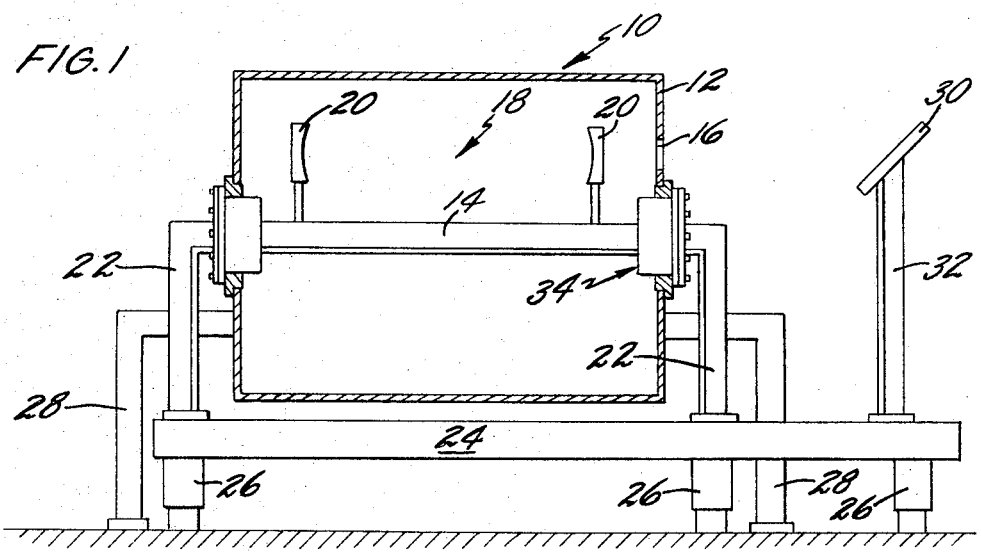
FIG. 1 is a simplified, schematic, side elevation view of a gas laser apparatus with the present invention.

Reference is made to FIG. 1 which shows schematically a gas laser 10 having a gas enclosure 12 within which an internal optical bench 14 is located; the enclosure has an output port 16 mounted on the bench and an optical resonator 18 which is formed between a pair of mirrors 20. A pair of internal optical bench support legs 22 are fixedly attached to the internal optical bench as will be described further hereinafter, the legs being supported on an external optical bench 24, which in turn is supported from ground by vibration isolation supports 26. The gas enclosure is supported from ground by rigid supports 28. Extending from the external optical bench is the external optics 30 which are fixedly attached to the external optical bench with an external optics frame 32. An enclosure interlock 34 is positioned at the interface of the internal optical bench, the internal optical bench support legs and gas enclosure.

Figure 2:
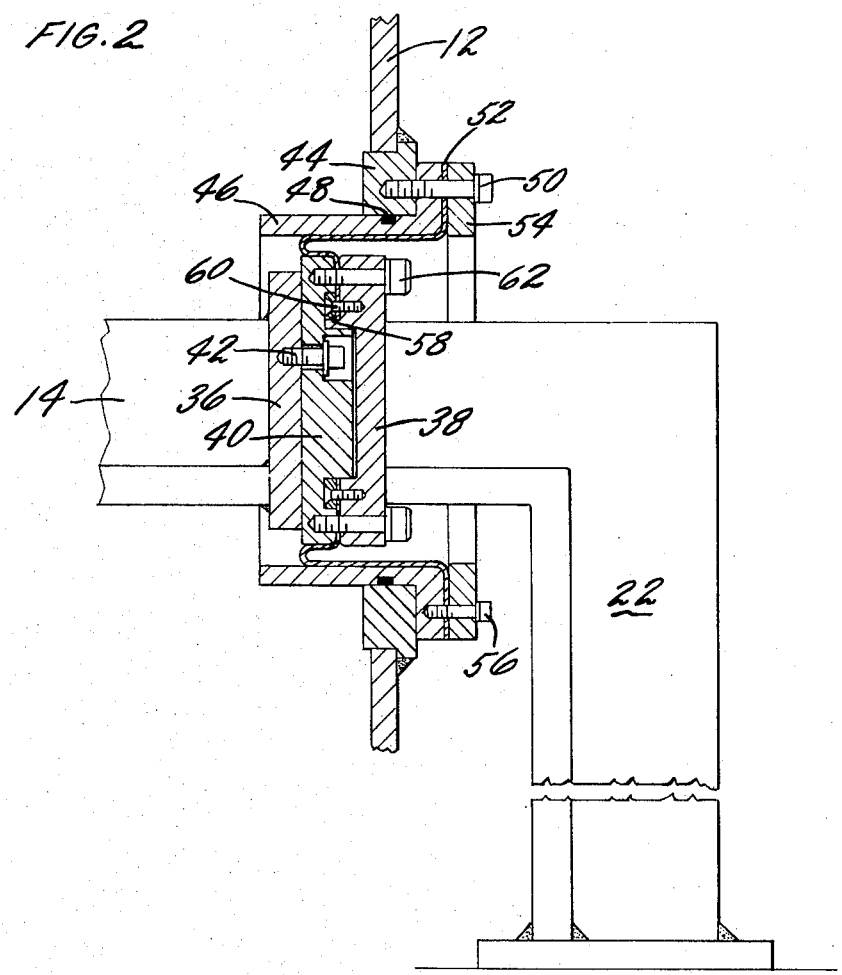
FIG. 2 is a simplified, schematic, sectional view of the interface between the internal optical bench and the gas laser enclosure.

Referring to FIG. 2 the enclosure interlock is shown in detail. An inner collar 36 is welded to the internal optical bench and an outer collar 38 is welded to the support leg. A fastening plate 40 is interposed between the inner and outer collars and held in place by fastening plate bolts 42. An annular boss ring 44 is welded to the gas enclosure; a sealing sleeve 46 having an O-ring seal 48 which interfaces with the boss ring is attached to the boss ring with boss ring bolts 50. An annular ring 52 of thin, flexible material is held along its outer periphery between the sealing sleeve 46 and a sealing ring 54 by the compressive load applied thereto by the boss ring bolts 50 and annular ring bolts 50 and annular ring bolts 56 which alternately penetrate the annular ring around its periphery. The inner periphery of the annular ring is fixedly attached to the outer collar by an inner ring 58 which is placed in compression by a plurality of annular ring attachment screws 60. The inner periphery of the annular ring is subjected to a compressive load between the opposing faces of the fastening plate and the outer collar due to the compressive loading by the outer collar bolts 62.

In the assembly of the enclosure interlock, the fastening plate 40 is bolted to the inner collar 34 with the fastening plate bolts 42. The annular ring 52 is then attached to the outer collar 38 with the inner ring 58 and the annular ring attachment screws 60. Next the support legs 22 are moved into place adjacent to the internal optical bench and the outer collar 38 is bolted to the fastening plate 40 with the outer collar bolts 62. The sealing sleeve 46 is pressed into position against the boss ring 44 of the gas enclosure, and the sealing ring 54 is attached to the boss ring by the boss ring bolts 50 with the annular ring 52 and the sealing sleeve 46 interposed as shown in FIG. 2.

The vibration isolation supports 26 shown in FIG. 1 are in effect high quality shock absorbers. These supports have have two functions, namely, to transfer the entire weight of the internal and external optical benches to a reference ground 64 while simultaneously preventing the transfer of any vibrational interference which may occur in the reference ground to the external optical bench. Obviously if vibrations are present in the external optical bench, these motions will be transmitted to the internal optical bench through the enclosure interlock thereby exposing the optical resonator to spurious motion thereby degradating the quality of the laser radiation produced in the resonator. The problem of absorbing vibrational motion in the vibration isolation support and preventing transmission of such motion to the external optical bench is one of degree and good load bearing isolators must be used. A vibration isolator comprising a matched pair of concentric cylinders which allow motion of one cylinder with respect to the other along their common cylindrical axis, and trap a volume of a fluid such as air in the common cavity formed internal of the cylinders has been found suitable.

The present invention is described with a laser resonator being internal of the gas enclosure. The resonator is only exemplary of the type of equipment found inside the enclosure and since the precise nature of these optics is immaterial to the invention, other embodiments such as single pass oscillator amplifiers, and oscillator amplifiers are equally applicable. Similarly the present invention is practiced primarily with chemical laser devices wherein a chemical reaction produces the gas species necessary for laser action in a reaction chamber and these gases are directed to the resonator region of the device; however, the invention is equally applicable to flowing or nonflowing lasers which are pumped electrically, optically or by gas dynamics.

The annular ring 52 can be made of almost any flexible material such as rubber or suitable plastic which is compatible with the atmosphere internal to the enclosure. An actual ring in use is made of a dacron woven fabric in a neoprene rubber matrix. The particular materials and geometry are flexible over a large range of pressure differentials between the inner and outer sides of the interlock thereby accommodating various conditions of operation without exceeding the structural limits of the annular ring. As a practical matter the actual pressure differential experienced by such a ring is between ten and fifteen pounds per square inch. The flexibility of the ring material causes it to absorb essentially the vibration in the gas enclosure and transmits none of this motion to the internal optical bench.

The particular interlock geometry described herein permits the internal optics to be fixedly attached to the external optics without comprising the integrity of the gas seal between the inner and outer optics. This is especially important since typical laser applications which require laser optics generally are required to contend with the disadvantage of having the internal and external systems undergo some degree of misalignment during the course of normal operation of the laser. The basic cause of the misalignment is the inability to tie all of the optics together in one rigid system due to the requirement that the internal optics be enclosed in a gas type envelope.

The present invention literally lends itself to ease of operation and maintenance of the laser system described With the removably attached components in the enclosure interlock, the internal optical bench and all the equipment attached thereto can be extracted from the enclosure by simply removing the boss ring bolts and the outer collar bolts and then sliding the internal optical bench from within the enclosure.

As shown in FIG. 1, the symmetric positioning of the interlocks around the internal bench is quite significant. In a symmetrical construction the loading forces on the interlocks, which are generally from the outside to the inside because of the low operating pressure inside the enclosure, null each other resulting in a balanced loading on the internal bench. The concept is equally applicable if the pressure internal of the enclosure is greater than the pressure surrounding the enclosure. In addition to their symmetric positioning, the interlocks are all sized to have the same surface area exposed to the pressure differential across the wall of the enclosure to insure a nulling of the pressure loading.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A gas laser system in which the optics of the system are insulated from the vibrations present in the environment and the auxiliary equipment, the system comprising:

A gas enclosure;

structural means fixedly attached to the gas enclosure to rigidly support the enclosure on a reference ground;

a first optical bench internal of the enclosure to support internal optical means used in the production of laser radiation;

a second optical bench external of the enclosure to provide support to the first bench;

a vibration isolation support to flexibly hold the second optical bench from the reference ground and insulate the second bench from vibrations which are otherwise transmitted from ground to the bench by absorption of the vibrations; and an enclosure interlock which rigidly joins the first bench to the second bench and is flexibly attached to the enclosure, the interlock having a flexible member which joins the enclosure to the optical benches, for forming a feedthrough in the enclosure which is gas tight for a pressure differential greater than one atmosphere and for insulating the optical benches from vibrations in the enclosure.

2. The invention according to claim 1 including further an auxiliary optics support fixedly attached to the second optical bench to position external optical means used to condition the beam of laer radiation produced with the internal optical means.

3. The invention according to claim 2 wherein the vibration isolation support is a pneumatic shock absorber.

4. The invention according to claim 1 wherein the enclosure interlock comprise;

an inner collar which is fixedly joined to the first optical bench an outer collar which is fixedly joined to the second optical bench;

a circular fastening plate which is secured to the inner collar;

an annular boss ring which is fitted to a hole in the gas enclosure and fixedly joined to the enclosure;

an annular sealing sleeve which is slidingly fitted into the boss ring and is removably attached to the boss ring;

an annular sealing ring which is removably attached to the sealing sleeve; and an annular ring of flexible material, the outer periphery of which is sandwiched between the sealing ring and the sealing sleeve and the inner circumference of which is removably attached to the outer collar.

* * * * *